United States Patent [19]

Brothers

[11] 4,350,464

[45] Sep. 21, 1982

[54] ANCHOR BOLT FOR CONCRETE

[76] Inventor: Richard L. Brothers, 3570 E. M-21, Corunna, Mich. 48817

[21] Appl. No.: 187,578

[22] Filed: Sep. 15, 1980

[51] Int. Cl.$^3$ .............................................. E04B 1/38
[52] U.S. Cl. .................................... 411/180; 411/389; 411/453; 52/698; 52/738; 10/1 B
[58] Field of Search ................. 52/698, 703, 737, 738; 411/180, 181, 183, 178, 176, 453, 452, 389, 388; 175/394, 395; 10/1 B

[56] References Cited

U.S. PATENT DOCUMENTS

| 1,485,202 | 2/1924 | Rosenberg | 411/453 |
| 1,891,895 | 12/1932 | Nagel | 411/453 |
| 1,989,018 | 1/1934 | Norwood | 72/105 |
| 2,006,813 | 6/1934 | Norwood | 72/105 |
| 3,092,162 | 6/1963 | Johnsen | 411/178 X |
| 3,897,713 | 8/1975 | Gugle | 411/389 |
| 3,967,525 | 7/1976 | Lerich | 85/79 |
| 3,986,429 | 10/1976 | Busler | 85/83 |
| 4,046,181 | 9/1977 | Barnsdale | 151/41.73 |
| 4,205,587 | 6/1980 | Van der Lugt | 85/64 |

FOREIGN PATENT DOCUMENTS 215874 7/1958 Australia .

*Primary Examiner*—Carl D. Friedman
*Attorney, Agent, or Firm*—Ian C. McLeod

[57] ABSTRACT

An anchor bolt (10) for use in concrete or masonry is described. The bolt is formed of an integral shaft (13) having an elongate round holding portion (12) defining a cylindrical surface with at least one helical or spiral patterned weld line (14) along the surface. The bolt is positioned in the concrete by being forced into a hole (101) having the same diameter as the shaft such that it rotates or turns as it is being forced into the hole due to the helical patterned weld line. The anchor bolt resists pulling from the concrete and is particularly adapted for use in holding machinery on concrete floors and in construction purposes in concrete flooring.

11 Claims, 7 Drawing Figures

ANCHOR BOLT FOR CONCRETE

BACKGROUND OF THE INVENTION

The present invention relates to an anchor bolt which is provided with a holding portion including at least one helical patterned weld line along a cylindrical shaft. The anchor bolt is adapted to being forcibly rotated into a hole into concrete of the same diameter as the shaft and is more resistant to being pulled from the concrete than prior art anchor bolts.

PRIOR ART

The prior art has described a number of different types of anchor bolts. Most of these bolts rely upon a wedging action for holding created by one first member of the bolt being forced into another second member which locks into the concrete. Prior art bolts of this type are referred to as "screw", "stud", "wedge", or "impact" anchors. In each instance the wedging action produces a radial expansion of the second member relative to the longitudinal axis of the bolt. Illustrative are the anchor bolts described in U.S. Pat. Nos. 1,989,018; 2,006,813, 3,967,525, 3,986,429; 4,046,181; 4,205,587 and Australian Pat. No. 215,874. The problem with such bolts is that the holding is localized in the hole in the concrete at a section of the second member wedged into the concrete and as a result the holding is relatively poor; particularly with loads which produce high vibration and thus pulling on the bolt such as with operating machinery.

A second type of prior art anchoring means is illustrated by locking nails or bolts with integrally formed helical patterned ridges on a cylindrical surface along the longitudinal axis. The nails are driven into relatively soft materials such as wood or the like. The problem is that the bolt or nail will not hold in concrete, usually because the ridge does not adequately lock into the concrete.

OBJECTS

Therefore, it is an object of the present invention to provide an anchor bolt particularly adapted for concrete which resists removal, including a cylindrical shaft defining a holding portion of the bolt with at least one weld line along the longitudinal axis of the shaft in a helical pattern. It is further an object of the present invention to provide a relatively simple and inexpensive method for the manufacture of the anchor bolt. Further still, it is an object of the present invention to provide a simple and inexpensive method for providing the bolt in concrete. These and other objects will become increasingly apparent by reference to the following description and to the drawings.

IN THE DRAWINGS

GENERAL DESCRIPTION OF THE INVENTION

Figure 1:
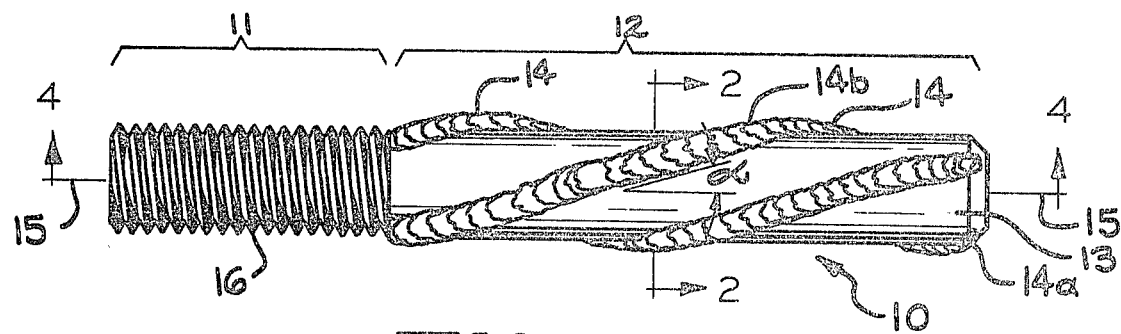
FIG. 1 is a front view of the preferred anchor bolt of the present invention particularly illustrating a shaft with a holding portion with three left handed, helical patterned weld bead lines on a cylindrical shaft and an extended portion including threads on the shaft providing a preferred attachment means.
Figure 2:
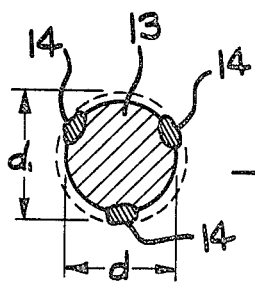
FIG. 2 is an end cross-sectional view along line 2—2 of FIG. 1 further illustrating the weld bead lines formed on the surface of the holding portion of the shaft.
Figure 3:
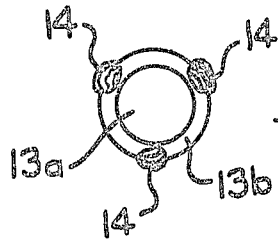
FIG. 3 is a right end view of the bolt shown in FIG. 1 illustrating a chamfered end of the shaft and weld bead line which provides ease in starting the bolt into a concrete hole of the same size as the shaft.

The present invention relates to the improvement in an anchor bolt including a metal shaft having a longitudinal axis and having a round cross-sectioned holding portion with a cylindrical surface along and around the axis and a diameter and adapted to be inserted in a hole in concrete the improvement which comprises providing at least one weld line around and along the cylindrical surface of the holding portion in a helical pattern along the axis such that the bolt will rotate when forced into a hole of essentially the same diameter in concrete and wherein the holding portion resists being pulled from the concrete along the axis of the shaft.

The present invention particularly relates to an anchor bolt adapted to be used in concrete which comprises a metal shaft having a longitudinal axis and having a round cross-sectioned holding portion with a cylindrical surface along and around the axis and adapted to be inserted into a hole in concrete of essentially the same diameter and having an extended portion of the shaft adjacent the holding portion adapted to extend away from the concrete and to be fitted with an attachment means; and at least one weld line around and along the cylindrical surface of the holding portion of the shaft in a helical pattern along the longitudinal axis such that the bolt will rotate when forced into the hole in the concrete and wherein the bolt resists being pulled from the concrete by a pulling force on the extended portion of the shaft.

The present invention also relates to the improvement in the method for fabricating an anchor bolt which comprises providing a metal shaft having a longitudinal axis and having a round cross-sectioned holding portion defining a cylindrical surface along and around the axis and adapted to be inserted into a hole in concrete of essentially the same diameter and having an extended portion of the shaft adjacent the holding portion adapted to extend away from the concrete; welding at least one metal weld line along the cylindrical surface of the holding portion of the shaft in a helical pattern along and around the longitudinal axis of the shaft, such that the bolt will rotate when forced into the hole in the concrete and wherein the bolt resists being pulled from the concrete by a pulling force on the extended portion of the shaft.

Finally the present invention relates to the method of inserting an anchor bolt into concrete which comprises: a metal shaft having a longitudinal axis and having a round cross-sectioned holding portion defining a cylindrical surface along and around the axis and a diameter with at least one weld line in a helical pattern along the surface having a larger effective diameter than the shaft having an extended portion of the shaft adjacent the holding portion adapted to extend away from the concrete and to be fitted with attachment means which is fitted with shielding means for providing a force on the extended portion of the shaft without damaging the bolt; drilling a hole in concrete having essentially the same diameter as the holding portion of the shaft and smaller than the effective diameter of the weld line; forcing the holding portion of the shaft into the hole using the shielding means; and removing the shielding means from the exposed portion of the bolt.

It is preferred to use at least two weld lines on the shaft since two weld lines provide significantly greater holding. In larger diameter shafts, more weld lines are used. The helical pattern of the line can be clockwise or counter-clockwise along the surface of the shaft. Where only one weld bead line is used it needs to extend further radially from the axis of the shaft to provide a tight fit in a hole in concrete.

SPECIFIC DESCRIPTION

Referring to FIGS. 1 to 4, a preferred anchor bolt 10 of the present invention is illustrated. Included is an extended portion 11 as an attachment means and a holding portion 12 on a cylindrical shaft 13. The holding portion 12 includes three separate identical helically patterned weld bead lines 14 spaced concentrically around and along the longitudinal axis 15 of the shaft 13. The weld bead line 14 has an effective diameter $d_1$ which is greater than the diameter d of the shaft 13. The end 13a of the shaft 13 is chamfered at 13b and the weld bead line 14 is tapered at 14a to provide ease of starting of the holding portion 12 into a hole 101 of essentially the same diameter as the shaft 13 in concrete or masonry 100 (see FIGS. 6 and 7). The extended portion 11 is provided with threads 16 adapted to receive a nut 17 as one preferred attachment means. The shaft 13 preferably has a high tensile strength and is made of steel such that it is not deformed upon being forced into a hole 101 in concrete 100.

Figure 5:
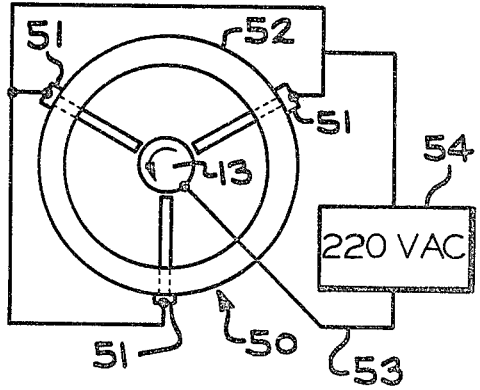
FIG. 5 is a schematic view of a high speed welding unit particularly illustrating arc welding means with welding rod which forms a helical weld bead line by rotation and movement of the bolt shaft along its longitudinal axis.

The weld bead lines 14 can be provided on the shaft 13 by hand welding using arc or gas welding or other conventional welding means. The bead line 14 pattern is marked on the shaft 13 and the line 14 is then welded. FIG. 5 shows a high production welding means 50 wherein welding rods 51 are provided around and fed through a circular insulating ring 52 concentrically disposed around the shaft 13. The shaft 13 is rotated counter-clockwise for a left handed bead line 14 with the shaft 13 moving away from the viewer. Electrical leads 53 connect the shaft 13 and the welding rods 51 to a 220 volt AC arc welder 54. Three (3) weld bead lines 14 can be welded simultaneously with the high production machine. In either instance, the threads 16 can be formed after the weld bead lines 14 are formed by leaving unwelded spaces along the shaft 13 for the extended portion 11 of the shaft 13.

Figures 6, 7:
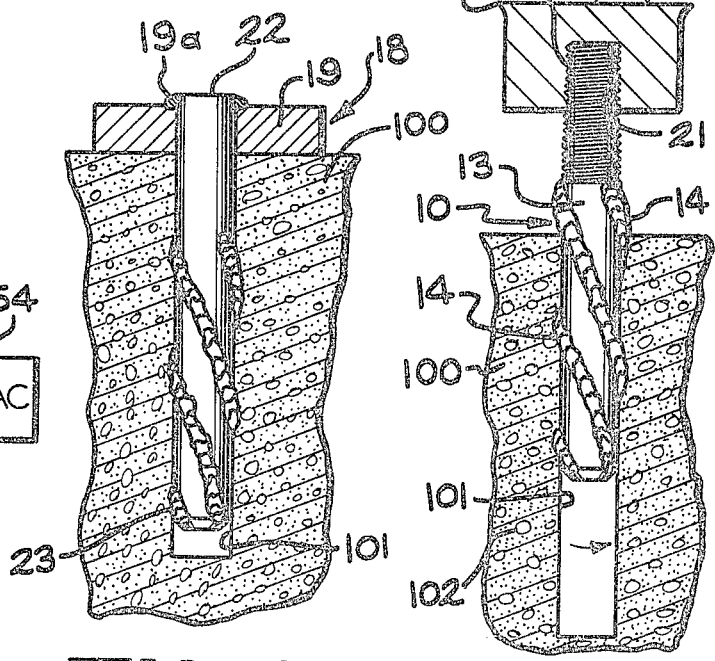
FIG. 6 is a front partial cross-sectional view of an anchor bolt inserted in concrete and also illustrating an alternative attachment means.
FIG. 7 is a front partial view of an anchor bolt, particularly illustrating the use of a removable shielding means shown in cross-section to drive the bolt into a hole in concrete.

FIG. 6 shows an anchor bolt 18 with alternative attachment means wherein plate 19 is welded at 19a on a shaft 22 as used in place of the nut 17. Weld bead lines 23 are provided along the shaft 22 as shown in FIGS. 1 to 4.

FIG. 7 shows the method for inserting the bolt 10 into a hole 101 in concrete 100. The hole 101 is round and has essentially the same diameter as the shaft 13. It is provided in the concrete using a masonry drill which is adapted to drill through the aggregate 102 (stones) in the concrete 100. A shielding means such as threaded cap 20 is used to hammer or otherwise exert a force F on the bolt 10 to thereby cause it to rotate into the hole 101 on the bead line 14. The cap 20 will have deformed portions 20a from hammering; however, the threads 16 remain undamaged. The cap 20 is removable after insertion of the bolt 10 and reusable.

Figure 4:
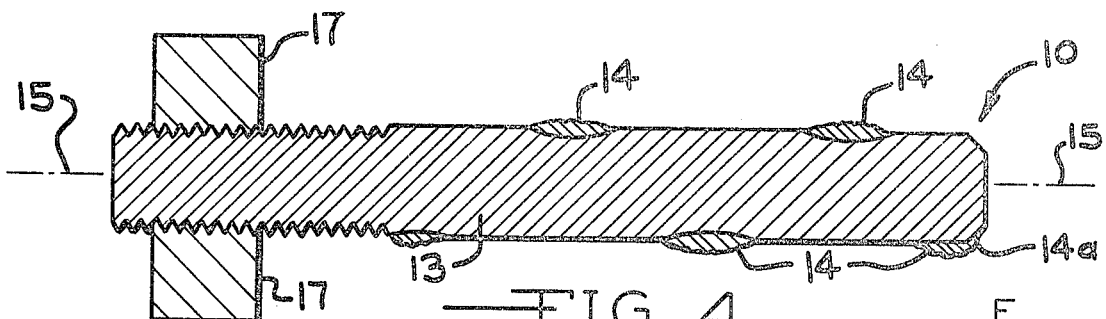
FIG. 4 is a front cross-sectional view of the anchor bolt along the longitudinal axis line 4—4 of FIG. 1 further illustrating the weld bead.

The weld bead line 14 is usually formed with a low strength steel welding rod. Brazing can also be used; however, it is not preferred where there is a chance of moisture because of the dissimilar metals. The bead 14 deforms as it encounters stones or other hard aggregate portions 102 of the concrete 100. The weld bead line 14 has an irregular sawtoothed surface associated with welding and preferably the rounded portion of each bead 14b faces toward the threads 16. The bead line 14 preferably has an angle alpha of about 30° relative to the axis 15 of the shaft 13, preferably between about 15° and 45° so that the bolt 10 rotates on bead line 14 as the bolt 10 is driven into a hole 101 in the concrete 100 of the same diameter as the shaft 13. It has been found that a lefthand or reverse thread for the weld bead line is preferred as shown in FIGS. 1, 4 and 6. Thus the bolt 10 turns into the hole 101 counter-clockwise upon insertion.

The bolts shown in Table I were built and tested, where the dimensions are in inches (times 2.54 for cm):

TABLE I

| Overall Length | Diameter | Holding Portion | Extended Portion | No. Beads | Bead Width | Bead Height |
|---|---|---|---|---|---|---|
| 5 | ½ | 3⅝ | 1⅜ | 2* | 3/16 | 1/16 to 5/64 |
| 6.5 | ⅝ | 4⅝ | 1⅞ | 3** | 3/16 | 1/16 to 5/64 |
| 7 | ¾ | 5 | 2 | 3** | 3/16 | 1/16 to 5/64 |

*opposite each other
**equally spaced

Each of the bolts provided very secure anchoring in concrete.

The anchor bolts 10 (or 18) of the present invention are simple to manufacture and have been found to be almost impossible to remove after being installed without damaging the concrete 100. This result is unexpected to one skilled in the art. It appears that the bead line 14 deforms when hard aggregate 102 is contacted upon rotating into the hole 101 allowing insertion of the anchor bolt 10, but that removal of the anchor bolt 10 requires pulling against the full length of the beads 14 all along the axis 115 of the bolt 10.

It will be apparent that the weld bead line 14 could be produced by welding a wire (not shown) with a helical pattern to the shaft 13. A beaded 14 surface could be provided by a stamping of the wire. Also the bead line 14 need not be a continuous line along the shaft 13.

I claim:

1. In an anchor bolt including a metal shaft having a longitudinal axis and having a round cross-sectioned holding portion with a cylindrical surface along and around the axis and a diameter and adapted to be inserted in a hole in concrete the improvement which comprises:

providing at least one weld line around and along the cylindrical surface of the holding portion in a helical pattern along the axis such that the bolt will rotate when forced into a hole of essentially the same diameter in concrete and wherein the holding portion resists being pulled from the concrete along the axis of the shaft.

2. An anchor bolt adapted to be used in concrete which comprises:
   (a) a metal shaft having a longitudinal axis and having a round cross-sectioned holding portion with a cylindrical surface along and around the axis and adapted to be inserted into a hole in concrete of essentially the same diameter and having an extended portion of the shaft adjacent the holding portion adapted to extend away from the concrete and to be fitted with an attachment means; and
   (b) at least one weld line around and along the cylindrical surface of the holding portion of the shaft in a helical pattern along the longitudinal axis such that the bolt will rotate when forced into the hole in the concrete and wherein the bolt resists being pulled from the concrete by a pulling force on the extended portion of the shaft.

3. The bolt of claim 2 wherein the shaft is integrally composed of a high tensile strength steel which is not deformed by being forced into the concrete and wherein the weld line is composed of a relatively low tensile strength metal in comparison to the shaft.

4. The bolt of claim 2 wherein the weld line has an irregular sawtoothed appearance with rounded faces of weld beads facing the extended portion.

5. The bolt of claim 2 wherein the extended portion of the shaft is round and is threaded so as to be fitted with a nut.

6. The bolt of claim 2 wherein the extended portion of the shaft is adapted to be welded with a plate to secure an object.

7. In the method for fabricating an anchor bolt the improvement which comprises:
   (a) providing a metal shaft having a longitudinal axis and having a round cross-sectioned holding portion defining a cylindrical surface along and around the axis and adapted to be inserted into a hole in concrete of essentially the same diameter and having an extended portion of the shaft adjacent the holding portion adapted to extend away from the concrete;
   (b) welding at least one metal weld line along the cylindrical surface of the holding portion of the shaft in a helical pattern along and around the longitudinal axis of the shaft, such that the bolt will rotate when forced into the hole in the concrete and wherein the bolt resists being pulled from the concrete by a pulling force on the extended portion of the shaft.

8. The method of claim 7 wherein the welding is with a low tensile strength steel welding rod along the cylindrical surface and wherein the shaft is integrally composed of a high strength steel which is not deformed by being forced into the concrete.

9. The method of claim 7 wherein there are at least two weld lines and wherein each of the weld lines is welded simultaneously using multiple welding rods which form weld beads in the line on the shaft.

10. The method of claim 9 wherein the shaft is rotated during welding to provide the helical weld bead lines.

11. The method of claim 7 wherein the extended portion of the rod is provided with threads after the welding is completed.

* * * * *